(12) United States Patent
Fishel et al.

(10) Patent No.: US 12,536,103 B1
(45) Date of Patent: Jan. 27, 2026

(54) DYNAMIC SNOOP-FILTER ALLOCATION FOR LARGE-SCALE MEMORY COHERENT SYSTEM

(71) Applicant: Google LLC, Mountain View, CA (US)

(72) Inventors: Liran Fishel, Ra'Anana (IL); David Dayan, Kfar Vitkin (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/623,464

(22) Filed: Apr. 1, 2024

(51) Int. Cl.
*G06F 12/0817* (2016.01)
*G06F 12/0831* (2016.01)

(52) U.S. Cl.
CPC ...... *G06F 12/0822* (2013.01); *G06F 12/0831* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; (Continued)

(56) References Cited

U.S. PATENT DOCUMENTS 6,405,322 B1 * 6/2002 Gaither ............... G06F 11/0793
711/146
10,339,059 B1 * 7/2019 Mattina ............... G06F 12/0822
(Continued)

OTHER PUBLICATIONS

S. Shukla and M. Chaudhuri, "Tiny Directory: Efficient Shared Memory in Many-Core Systems with Ultra-Low-Overhead Coherence Tracking," 2017 IEEE International Symposium on High Performance Computer Architecture (HPCA), Austin, TX, USA, 2017, pp. 205-216, doi: 10.1109/HPCA.2017.24. (Year: 2017).*
(Continued)

*Primary Examiner* — Daniel C. Chappell
(74) *Attorney, Agent, or Firm* — Lerner David LLP

(57) ABSTRACT

Aspects of the disclosed technology include techniques and mechanisms for dynamic snoop-filter allocation for large-scale memory coherent systems. A coherency manager on an interconnect manages a directory storing data that indicates a current state of each cache line stored within each caching agent on the interconnect and a number of caching agents that share a cache line. Based on receiving a request from a caching agent to access to a cache line, the coherency manager uses a capacity of the directory, such as the number of caching agents that share a cache line, to determine whether to change an operation mode of a memory from a first mode to a second mode.

16 Claims, 7 Drawing Sheets

(58) Field of Classification Search
CPC ...... G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | |
|---|---|---|---|
| 11,237,965 | B2 | 2/2022 | Forrest et al. |
| 11,734,177 | B2 * | 8/2023 | Robinson ............ G06F 12/0833 711/146 |
| 2007/0233932 | A1 * | 10/2007 | Collier ................ G06F 12/0826 711/100 |
| 2008/0005338 | A1 | 1/2008 | Yin |
| 2017/0286299 | A1 * | 10/2017 | Sury ................... G06F 12/0811 |
| 2020/0042446 | A1 | 2/2020 | Mittal et al. |

OTHER PUBLICATIONS

Counting Stream Registers: an Efficient and Effective Snoop Filter Architecture; Ranganathan, Aanjhan, et al; pp. 120-127.

Formal Analysis of the ACE Specification for Cache Coherent Systems-on-Chip Abderahman Kriouile, Wendelin Serwe, Sep. 2013; 16 pgs.

* cited by examiner

| Tag | Caching Agent(s) Index | Cache Line Address |
|---|---|---|
| 0 | 01 | 001; 003 | 0000 0001 |
| 1 | 00 | 002; 004; 003 | 0010 0100 |
| 2 | 11 | 003; 002 | 0001 0011 |
| 3 | 10 | 004; 001 | 1010 1010 |
| ... | ... | ... | ... |
| N | ... | ... | ... |

Shared Cache Lines Being Tracked: ___

Directory Capacity: N

FIG. 3

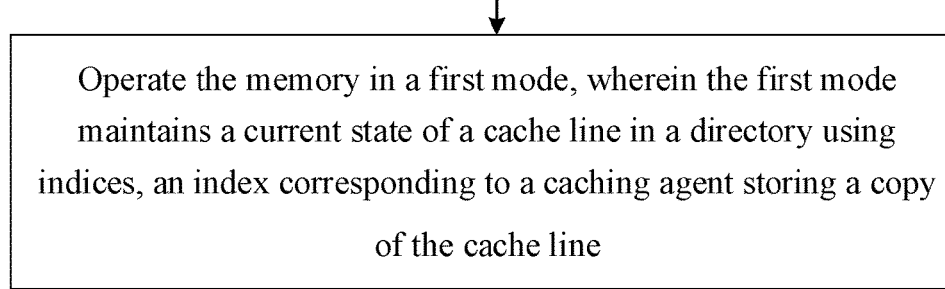

Operate the memory in a first mode, wherein the first mode maintains a current state of a cache line in a directory using indices, an index corresponding to a caching agent storing a copy of the cache line — 501

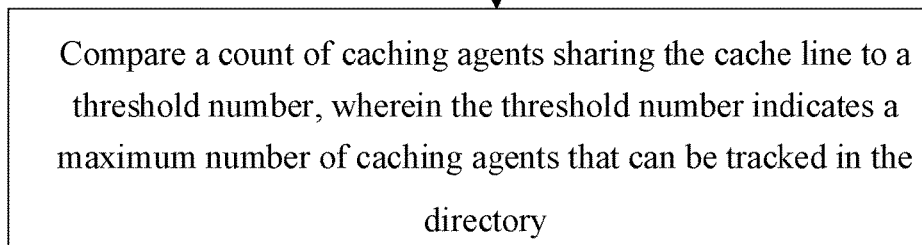

Compare a count of caching agents sharing the cache line to a threshold number, wherein the threshold number indicates a maximum number of caching agents that can be tracked in the directory — 502

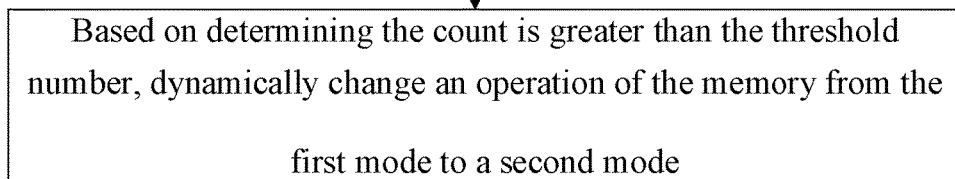

Based on determining the count is greater than the threshold number, dynamically change an operation of the memory from the first mode to a second mode — 503

FIG. 5

DYNAMIC SNOOP-FILTER ALLOCATION FOR LARGE-SCALE MEMORY COHERENT SYSTEM

BACKGROUND

In large-scale memory coherent systems, a coherency manager may be used to manage memory coherency. The coherency manager typically transmits snoops to the cache of one or more caching agents to determine whether a caching agent holds a copy of a requested cache line. The coherency manager does not have prior knowledge of the state of the requested cache line (e.g., a location of the requested cache line). As such, the coherency manager is unable to identify a caching agent that holds a copy of the requested cache line and may send snoops to all of the caching agents within the system for every memory transaction. Sending snoops to all of the caching agents requires large amounts of bandwidth and power in large-scale memory coherent systems.

Tracking the state of each cache line stored in each caching agent in a large-scale memory coherent system with many caching agents and/or large cache sizes can use large amounts of memory. The amount of memory needed to track the state of each cache line can be reduced by grouping together several caching agents that may share a cache line and flagging the group to indicate that at least one caching agent within the group holds a copy of the cache line. While this reduces the amount of memory needed to track the current state of each cache line, doing so also increases the amount of snoop traffic within the system, impacting system performance and increasing the power consumption of the system and increasing bandwidth usage of the system.

SUMMARY

Aspects of the disclosed technology include methods, apparatuses, systems, and computer-readable media for dynamic snoop-filter allocation for large-scale memory coherent systems. A coherency manager on, or otherwise connected to, an interconnect may manage a directory that stores data indicating a current state of cache lines stored within caching agents. The caching agents may be on, or otherwise connected to, the interconnect. Caching agents may share one or more cache lines, where each cache line corresponds to data that is stored within a main system memory and that is available to each caching agent.

The coherency manager may receive a request from a caching agent to access a cache line. In response, the coherency manager may determine the number of caching agents that share a cache line to determine whether to dynamically change an operation mode of a memory from a first mode to a second mode. In this regard, the coherency manager may compare the number of caching agents that share a cache line to a threshold number indicating a maximum number of caching agents that the directory can track. If the number of caching agents sharing a cache line is equal to or less than the threshold number, the coherency manager maintains operation of the memory in the first mode. If the number of caching agents sharing a cache line is greater than the threshold number, the coherency manager changes the operation of the memory from the first mode to the second mode. In some instances, if the number of caching agents sharing a cache line is equal to the threshold number, the coherency manager may change the operation of the memory.

In the first memory mode, and for each cache line stored by a caching agent, the coherency manager tracks the current state of a cache line using indices. An index identifies a caching agent that stores a copy of the cache line. Each caching agent on the interconnect that stores a copy of the cache line is assigned a different index. Based on receiving the request to access the cache line and maintaining the memory in the first mode, the coherency manager queries the directory to identify the index of the caching agent that holds a copy of the requested cache line. The coherency manager transmits a snoop to the identified caching agent storing the copy of the requested cache line. The snoop may include instructions for the identified caching agent to perform an action, such as transmitting the copy of the cache line to the caching agent that generated the request.

In the second memory mode, the coherency manager tracks groups of caching agents using a bitmap. A single bit may represent a group of caching agents where at least one caching agent within the group holds a copy of the cache line. Based on receiving the request to access the cache line and/or changing the operation of the memory to the second mode, the coherency manager may identify a group containing at least one caching agent that holds a copy of the cache line. The coherency manager transmits multicast snoops to the group (e.g., to each caching agent in the group) to identify the caching agent storing the copy of the cache line. The multicast snoops include instructions to, for example, transmit the copy of the cache line to the caching agent that generated the request if the caching agent that received the snoop holds the copy of the cache line. Each snoop of the multicast snoops might not be identical. For example, each snoop of the multicast snoops can include different instructions.

The coherency manager filters the snoops that are transmitted to the caching agents. The snoop filter allows the coherency manager to track the location of each cache line stored in each caching agent's cache memory. As such, the coherency manager transmits snoops only to the caching agents that hold the copy of the requested cache line or to the caching agents within a group that contains at least one caching agent that holds the copy of the requested cache line.

One aspect of the disclosure provides for a method for switching between modes of memory, the method comprising: operating the memory in a first mode, wherein the first mode maintains a current state of a cache line in a directory using indices, an index corresponding to a caching agent storing a copy of the cache line; comparing a count of caching agents sharing the cache line to a threshold number, wherein the threshold number indicates a maximum number of caching agents that can be tracked in the directory; and based on determining the count is greater than the threshold number, dynamically changing an operation of the memory from the first mode to a second mode.

In the foregoing instance, the method further comprises receiving, from a first caching agent, a request to access the cache line; and increasing the count.

In the foregoing instances, the method further comprises, based on determining the count is equal to or less than the threshold number, querying the directory using a cache line address to identify a second index of a second caching agent storing the copy of the cache line.

In the foregoing instances, the method further comprises transmitting a snoop to the second caching agent, the snoop comprising instructions to: transmit the copy of the cache line to the first caching agent; invalidate the copy of the cache line; or change a state of the cache line.

In the foregoing instances, the method further comprises determining, based on querying the directory, none of the caching agents in the directory store the copy of the cache line; retrieving, in response to determining none of the caching agents in the directory store the copy of the cache line, the copy of the cache line from a main memory; and transmitting the copy of the cache line to the first caching agent.

In the foregoing instances, the method further comprises assigning the index to the first caching agent; and generating a record in the directory, the record indicating that the first caching agent stores a copy of the cache line.

In the foregoing instances, the method further comprises receiving, from a first caching agent, a request to remove the cache line from a memory associated with the first caching agent; and decreasing the count.

In the foregoing instances, the second mode identifies caching agents storing the copy of the cache line using a bitmap.

In the foregoing instances, a single bit corresponds to a group of caching agents, wherein one or more caching agents of the group store the copy of the cache line.

In the foregoing instances, the method further comprises, based on receiving a request to access the cache line, transmitting multicast snoops to one or more groups to identify the caching agent storing the copy of the cache line.

Another aspect of the disclosure provides for a system for switching between modes of memory, the system comprising: a first caching agent; a second caching agent; an interconnect configured to connect the first caching agent, the second caching agent, and a caching agent manager; and the caching agent manager comprising one or more processors configured to: operate the memory in a first mode, wherein the first mode maintains a current state of a cache line in a directory using indices, an index corresponding to a caching agent storing a copy of the cache line; compare a count of caching agents sharing the cache line to a threshold number, wherein the threshold number indicates a maximum number of caching agents that can be tracked in the directory; and based on determining the count is greater than the threshold number, dynamically change an operation of the memory from the first mode to a second mode.

In the foregoing instance, the one or more processors are further configured to: receive, from the first caching agent, a request to access the cache line; increase the count; and based on determining the count is equal to or less than the threshold number, query the directory using a cache line address to identify a second index of the second caching agent storing the copy of the cache line.

In the foregoing instances, the one or more processors are further configured to: determine, based on querying the directory, none of the caching agents in the directory store the copy of the cache line; retrieve the copy of the cache line from a main memory based on determining none of the caching agents in the directory store the copy of the cache line; and transmit the copy of the cache line to the first caching agent.

In the foregoing instances, the second mode identifies caching agents storing the copy of the cache line using a bitmap; and a single bit on the bitmap corresponds to a group of caching agents, wherein one or more caching agents of the group store the copy of the cache line.

In the foregoing instances, the one or more processors are further configured to, based on receiving a request to access the cache line, transmit multicast snoops to one or more groups to identify a caching agent storing the copy of the cache line.

Another aspect of the disclosure provides for a non-transitory computer readable storage medium storing instructions that, when executed by one or more processors for switching between modes of memory, cause the one or more processors to: operate the memory in a first mode, wherein the first mode maintains a current state of a cache line in a directory using indices, an index corresponding to a caching agent storing a copy of the cache line; compare a count of caching agents sharing the cache line to a threshold number, wherein the threshold number indicates a maximum number of caching agents that can be tracked in the directory; and based on determining the count is greater than the threshold number, dynamically change an operation of the memory from the first mode to a second mode.

In the foregoing instance, the one or more processors are further configured to: receive, from a first caching agent, a request to access the cache line; increase the count; and based on determining the count is equal to or less than the threshold number, query the directory using a cache line address to identify a second index of a second caching agent storing the copy of the cache line.

In the foregoing instances, the one or more processors are further configured to: determine, based on querying the directory, none of the caching agents in the directory store the copy of the cache line; retrieve the copy of the cache line from a main memory; and transmit the copy of the cache line to the first caching agent.

In the foregoing instances, the second mode identifies caching agents storing the copy of the cache line using a bitmap; and a single bit on the bitmap corresponds to a group of caching agents, wherein one or more caching agents of the group store the copy of the cache line.

In the foregoing instances, the one or more processors are further configured to: based on receiving from a first caching agent a request to access the cache line, transmit multicast snoops to the one or more caching agents of the group to identify a second caching agent storing the copy of the cache line; identify the second caching agent storing the copy of the cache line based on transmitting the multicast snoops; and instruct the second caching agent to transmit the copy of the cache line to the first caching agent.

BRIEF DESCRIPTION OF THE DRAWINGS

FIG. 3 illustrates an example directory using indices to execute dynamic snoop-filter allocation for large-scale memory coherent systems, in accordance with aspects of the disclosure.

FIG. 5 illustrates a flow diagram for an example method for dynamic snoop-filter allocation for large-scale memory coherent systems, in accordance with aspects of the disclosure.

DETAILED DESCRIPTION

Overview

Figure 1:
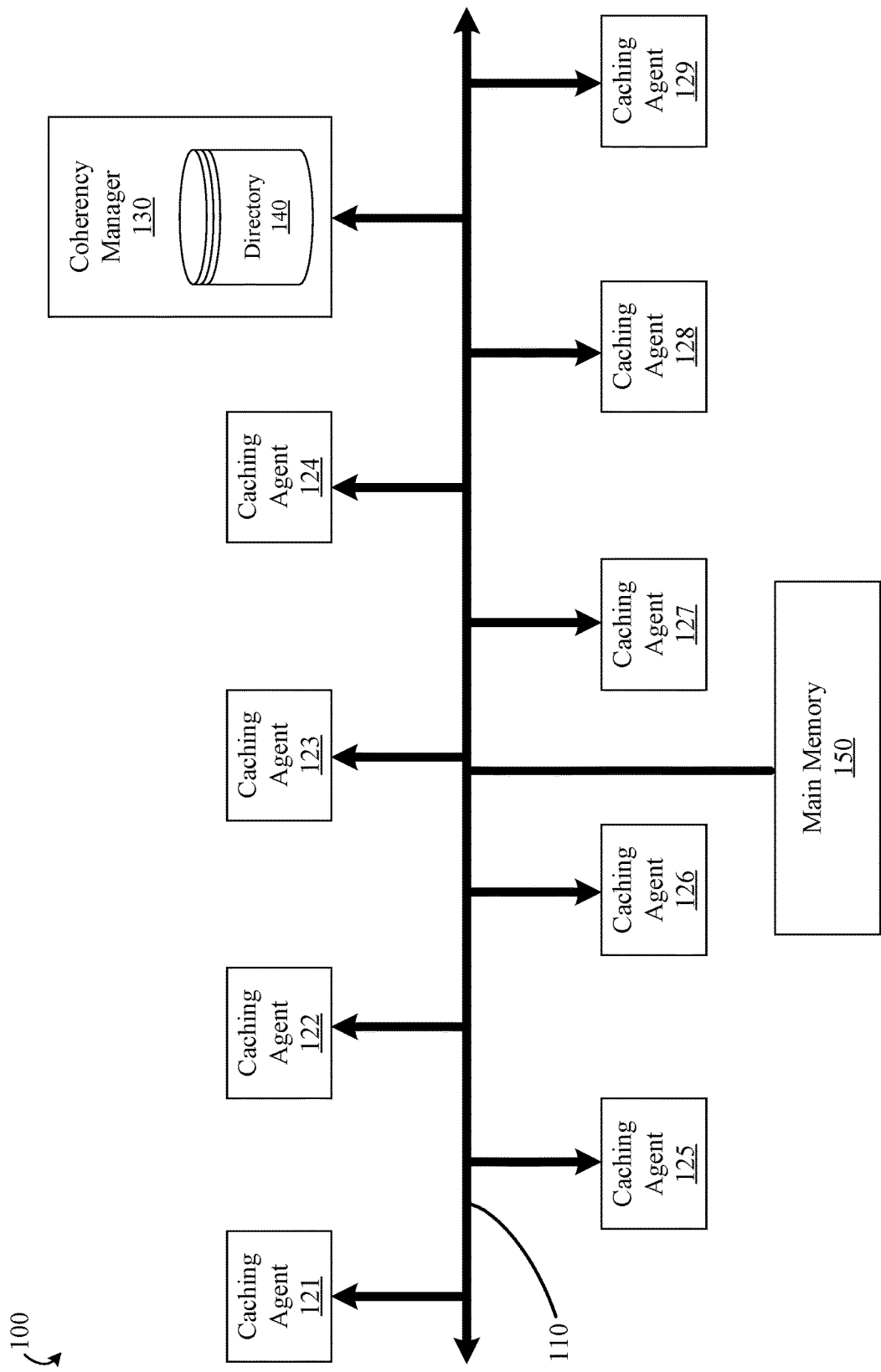
FIG. 1 illustrates an example memory coherent system for dynamic snoop-filter allocation for large-scale memory coherent systems, in accordance with aspects of the disclosure.

The technology described herein is directed to using a snoop filter to dynamically switch between two modes of use of memory. The first mode includes accurately tracking caching agents' caches by assigning an index to each caching agent that holds a cache line. The second mode includes grouping caching agents together within one or more bits and using a bit field (also referred to herein as a bitmap) that signals groups of caching agents storing copies of cache lines according to the location of the bit in the bit field. The switch between the two modes occurs based on a number of caching agents sharing a cache line. For example, when the number of caching agents sharing the cache line is small, the memory is used as an index. When the number of caching agents sharing the cache line exceeds a maximum number of caching agents, the memory is used as a bit field. Using the memory in two different ways provides for high performance, while the memory consumes lower silicone area and lower power, resulting in a lower cost of producing and maintaining a silicone device.

A coherency manager can dynamically change between two methods of use of memory. The memory method is decided based on the number of caching agents sharing a specific cache line. The decision of which memory method to use is performed independently for each cache line and is independent of the method used by other cache lines.

A directory can track a certain number of caching agents while maintaining precision based on a capacity of the directory. However, the information within the directory may become less precise when the number of caching agents sharing the same cache line is greater than the number of caching agents that the directory can precisely track.

For each cache line, the coherency manager keeps track of the number of caching agents sharing the cache line. The coherency manager checks if the number of caching agents can be tracked precisely. In this regard, the coherency manager may compare the number of caching agents sharing the cache line to the number of caching agents that the directory can support (referred to as a threshold number). If the number of caching agents sharing the cache line is equal to or less than the threshold number, then the coherency manager uses an indexing method in the memory.

In the indexing method, each caching agent corresponds to an index. When the coherency manager queries the directory to determine the current state of the cache line, the directory may indicate that a specific index holds a copy of the cache line. The coherency manager sends a snoop to the caching agent associated with the indicated index.

However, if the number of caching agents sharing the cache line is greater than the threshold number, then the coherency manager uses a bitmap method in the memory. In the bitmap method, caching agents can be grouped together and assigned to a single bit, or more than one bit. The state of the bit or bits indicates that at least one of the caching agents in the group holds a copy of the cache line. For example, a bit state of "1" may indicate that at least one of the caching agents assigned to that bit holds a copy of the cache line. Therefore, when the coherency manager queries the directory to determine the current state of the cache line, the state of each bit of the bitmap indicates the groups consisting of caching agents that may hold copies of the cache line. The coherency manager can use the bitmap to multicast snoops to each group on the interconnect. Groups may contain caching agent(s) that do not hold a copy of the cache line. Consequently, the coherency manager might send snoops to caching agents that do not hold a copy of the cache line. Sending a snoop to a caching agent that does not hold a copy of the requested cache line is functionally correct, but can impact the performance of the system and increase the power consumption of the system.

Example Systems

FIG. 1 illustrates an example memory coherent system for dynamic snoop-filter allocation for large-scale memory coherent systems. System 100 contains one or more central processing unit (CPU) cores that communicate via an interconnect. A CPU core may be a computing device that includes at least a processor and cache. Each CPU core within the system may be considered a caching agent located on the interconnect. As illustrated in FIG. 1, system 100 includes caching agents 121-129, configured to communicate via interconnect 110. While nine caching agents are shown in FIG. 1, a system may include more or fewer than nine caching agents.

A caching agent, such as one of caching agents 121-129, may store cache lines in its cache. Each cache line for which one or more caching agent holds a copy is also stored in main memory 150. Further, main memory 150 stores cache lines that may not have been requested by a caching agent or stored in a caching agent. Coherency manager 130 communicates with main memory 150 via interconnect 110. In some instances, coherency manager 130 retrieves cache lines from main memory 150 based on receiving a cache line request and determining that none of caching agents 121-129 hold a copy of the requested cache line.

Figure 2:
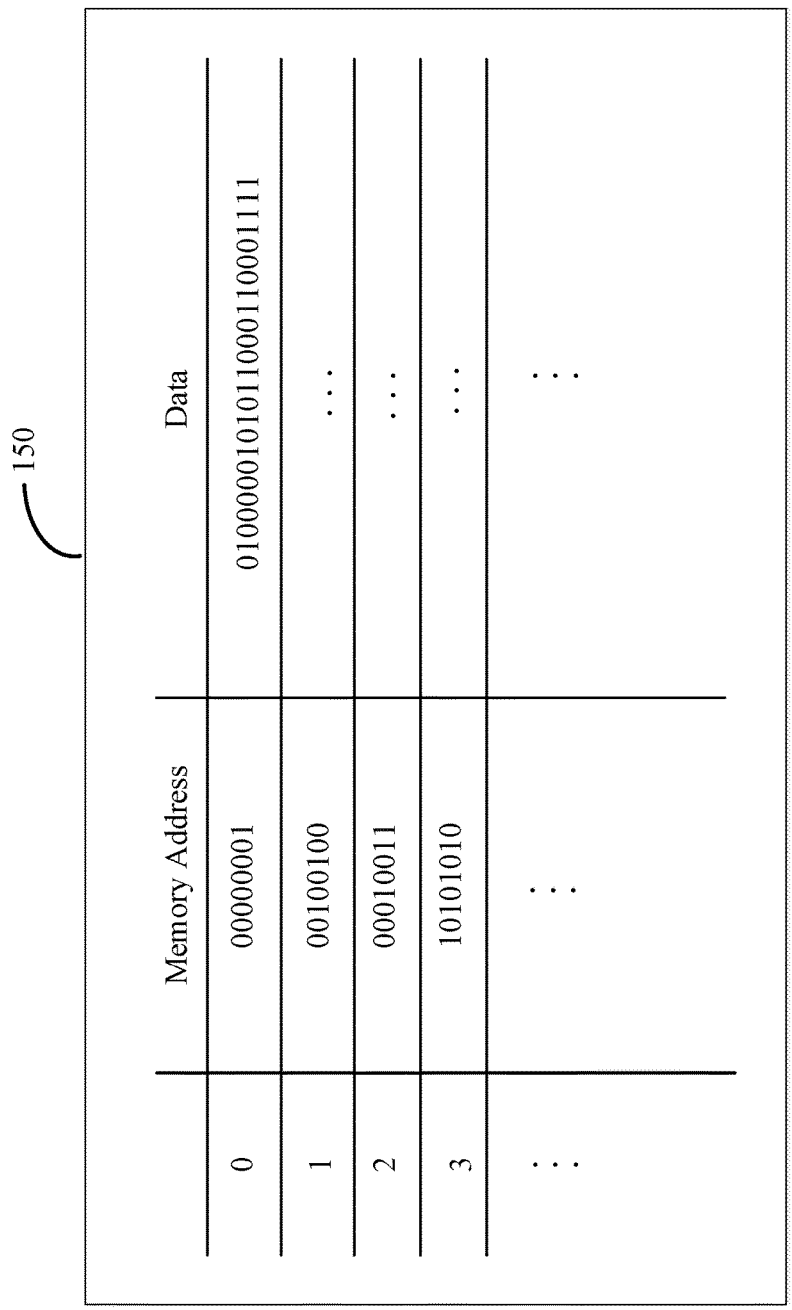
FIG. 2 illustrates an example main memory for dynamic snoop-filter allocation for large-scale memory coherent systems, in accordance with aspects of the disclosure.

FIG. 2 illustrates an example of main memory for dynamic snoop-filter allocation for large-scale memory coherent systems. As illustrated in FIG. 2, main memory 150 monitors a plurality of memory addresses. In some instances, each memory address is an eight-bit binary address, although each memory address may be any address having any number of bits. Further, main memory 150 stores the data associated with each memory address. In some instances, the data associated with each memory address is stored using binary. Main memory 150 receives updates from coherency manager 130 as caching agents 121-129 modify (e.g., supplement, remove, edit, replace, or the like), delete, or add cache line data. As discussed in detail herein, the data in main memory 150 can also be used to populate directory 140.

Returning to the discussion of FIG. 1, system 100 also includes coherency manager 130, which is configured to communicate with caching agents 121-129 via interconnect 110. Coherency manager 130 maintains a coherence protocol. By maintaining the coherence protocol, coherency manager 130 ensures that shared cache lines are consistent across each caching agent that holds a copy of the shared cache line. Therefore, coherency manager 130 ensures that caching agents sharing the cache line do not store old or stale cache line data.

Coherency manager 130 maintains the coherency protocol using directory 140. Directory 140 stores data that indicates a current state of each cache line. The current state of a cache line identifies one or more of caching agents 121-129 that hold a copy of the cache line. Based on receiving a request from caching agents 121-129 to access a cache line, coherency manager 130 queries directory 140 to identify at least one of caching agents 121-129 that holds a copy of the requested cache line.

Coherency manager 130 configures directory 140 to operate as one of an index or a bitmap. FIG. 3 illustrates an example directory using indices to execute dynamic snoop-filter allocation for large-scale memory coherent systems. When operating as an index, directory 140 uses indices associated with caching agents 121-129 to indicate the current state of each cache line that is currently held by caching agents 121-129. For example, copies of the cache line at cache line address 0010 0100 are held by the caching agents that correspond to indices 002, 004, and 003. Indices 002, 004, and 003 each correspond to one of caching agents 121-129. Therefore, the current state of the cache line at cache line address 0010 0100 is that three caching agents hold copies of the cache line.

Further, as illustrated in FIG. 3, directory 140 also stores, for each cache line, a cache line address and a tag that corresponds to an entry in main memory 150. Directory 140 is configured to monitor a predetermined number of shared cache lines, such as cache lines that are shared by caching agents 121-129. The predetermined number of shared cache lines that are monitored in directory 140 indicates the directory capacity. The directory capacity is the maximum number of shared cache lines that can be tracked in directory 140 without losing precision. The directory capacity is also referred to herein as a threshold number. Directory 140 tracks a number of shared cache lines that are currently being monitored. As discussed in detail herein, coherency manager 130 may use the threshold number and the number of shared cache lines that are currently being monitored to determine when to switch the operation of the directory from an index to a bitmap.

Figure 4A:
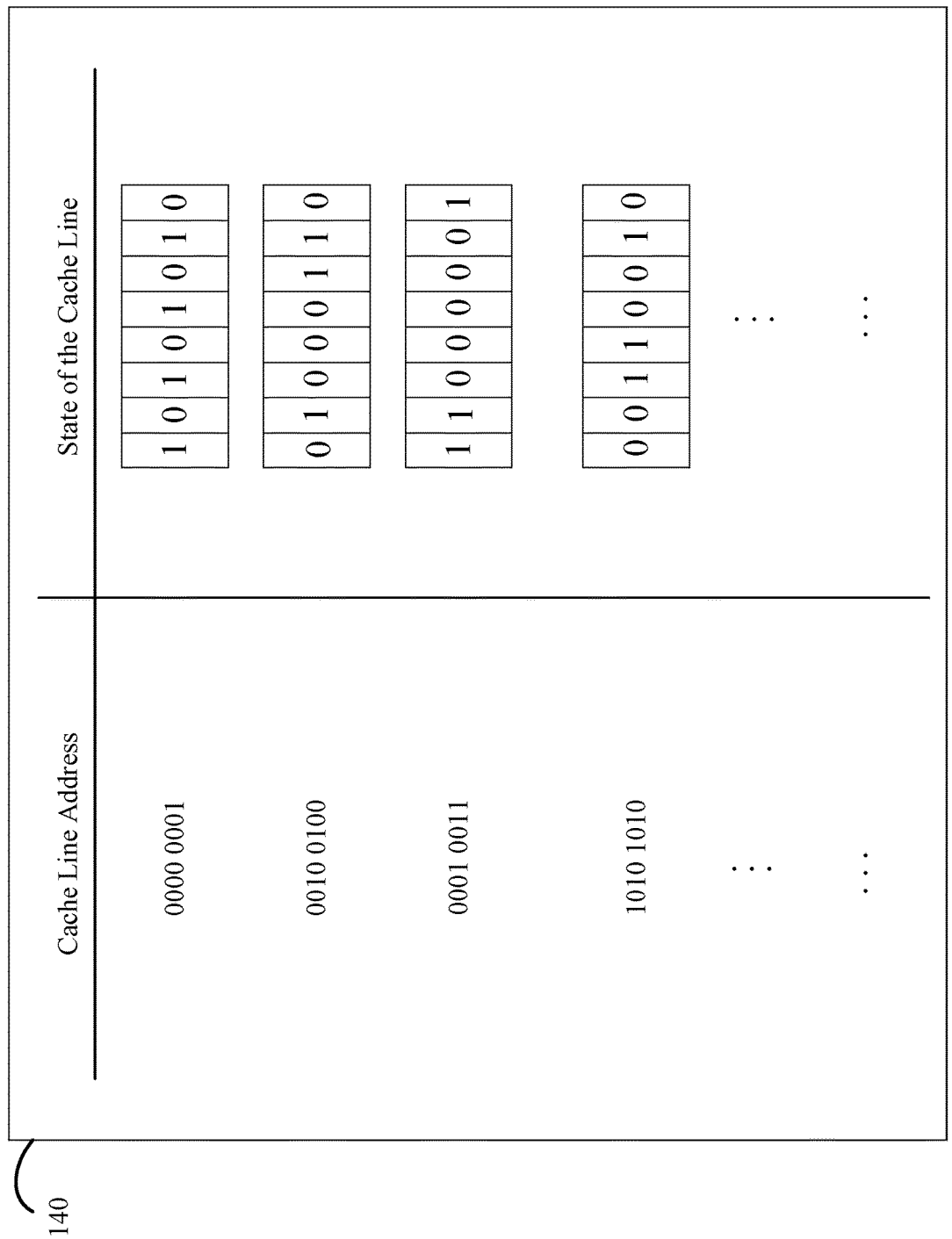
FIG. 4A illustrates an example directory using a bitmap to execute dynamic snoop-filter allocation for large-scale memory coherent systems, in accordance with aspects of the disclosure.

When the number of shared cache lines exceeds the threshold number, directory 140 may be configured to operate as a bitmap. FIG. 4A illustrates an example directory using a bitmap to execute dynamic snoop-filter allocation for large-scale memory coherent systems. Coherency manager 130 changes the operation mode of directory 140 when the number of caching agents sharing a cache line exceeds the threshold number such that the totality of caching agents sharing a cache line cannot be stored in directory 140 using indices. As such, the coherency manager generates a bitmap for each cache line. As illustrated in FIG. 4A, directory 140 stores, for each cache line stored by caching agents 121-129, a corresponding cache line address and a bitmap that indicates the current state of the cache line.

Figure 4B:
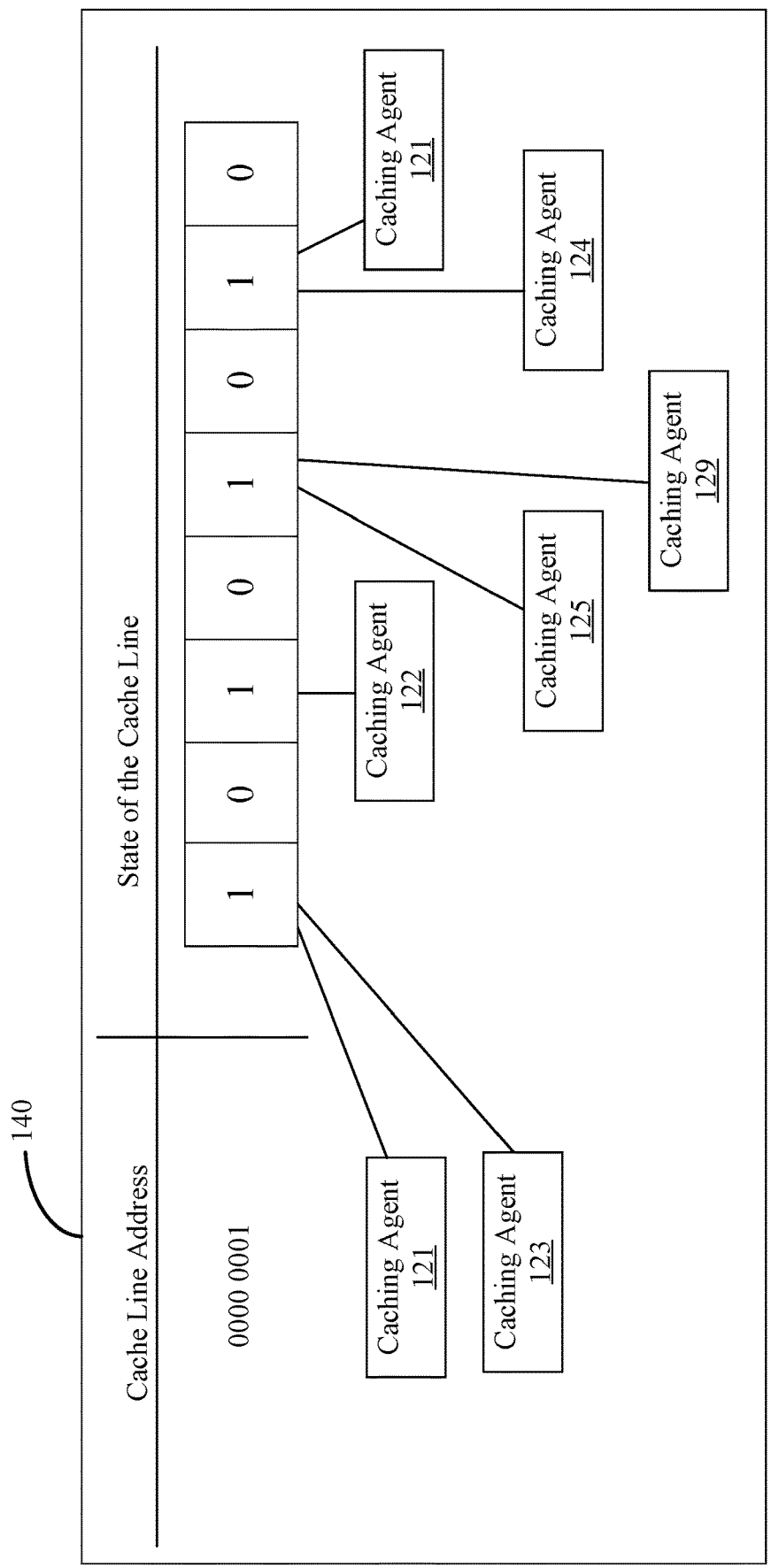
FIG. 4B illustrates an example bitmap used to execute dynamic snoop-filter allocation for large-scale memory coherent systems, in accordance with aspects of the disclosure.

At least one caching agent is assigned to each bit and a state of the bit indicates whether at least one of the caching agents assigned to the bit holds a copy of the cache line. FIG. 4B illustrates an example bitmap used to execute dynamic snoop-filter allocation for large-scale memory coherent systems. In particular, FIG. 4B depicts an example bitmap that corresponds to example cache line address 0000 0001. A bit state of "0" indicates that none of the caching agents assigned to the bit hold a copy of the requested cache line. A bit state of "1" indicates that at least one of the caching agents assigned to the bit holds a copy of the requested cache line.

Coherency manager 130 responds to requests from caching agents 121-129 to access cache lines by querying directory 140 to determine the current state of the cache line. Based on determining none of caching agents 121-129 hold a copy of the requested cache line, coherency manager 130 retrieves a copy of the requested cache line from main memory 150 and transmits the copy to the caching agent that generated the request. However, in some instances, coherency manager 130 determines that at least one of caching agents 121-129 holds a copy of the requested cache line and uses snoops to instruct the caching agent holding the copy of the requested cache line to grant cache line access to the caching agent that generated the request. As such, coherency manager 130 maintains coherence across caching agents 121-129 using snoops.

A snoop is a command transmitted from coherency manager 130 to at least one of caching agents 121-129 to perform some action. Coherency manager 130 may use a snoop to determine whether a specific caching agent is storing a copy of the requested cache line. Further, in some instances, coherency manager 130 may use snoops to instruct a caching agent to forward a copy of the requested cache line to the caching agent that generated the request, invalidate its copy of a cache line, change the state of a cache line, or the like. Snoops are transmitted between coherency manager 130 and caching agents 121-129 and, as such, are considered traffic on interconnect 110. Snoops may impact the performance of caching agents 121-129 since, upon receipt of a snoop, a caching agent processes the snoop and performs some action in response. Therefore, coherency manager 130 filters the number of snoops that are transmitted to reduce the bandwidth, power consumption, and resources that are needed to transmit and process the snoops and to reduce the amount of interruptions that each caching agent faces upon receipt of a snoop. Further, snoops are filtered to avoid sending snoops to caching agents that do not store a copy of the requested cache line.

Coherency manager 130 uses information within directory 140 to filter the snoops using one of a precise snoop filter or an imprecise snoop filter. More specifically, coherency manager 130 uses the information within directory 140 to identify the specific caching agent to which a snoop should be transmitted. As discussed above, directory 140 keeps a record of each cache line address and an indication of each caching agent that holds a copy of the cache line at each cache line address. More than one of caching agents 121-129 may hold a copy of a specific cache line. In such instances, directory 140 groups together several of caching agents 121-129 that each hold a copy of the specific cache line.

For each cache line in directory 140, directory 140 contains records of N number of caching agents with a precise index for each one. For example, directory 140 may have the capacity to be precise for up to N caching agents. For each caching agent up to the Nth number of caching agents, directory 140 can determine whether any of caching agents 121-129 contain a copy of the shared cache line. In such instances, coherency manager 130 uses a precise snoop filter as it is able to identify, based on querying directory 140, the caching agent that holds a copy of the requested cache line. Example implementations using a precise snoop filter and an imprecise snoop filter are discussed below.

Based on receiving from a caching agent a request to access a cache line, coherency manager 130 increases the number of caching agents sharing a cache line by one. Coherency manager 130 uses directory 140 to compare the number of caching agents sharing a cache line to the maximum number of caching agents that directory 140 can track precisely (also referred to as the threshold number). Based on determining that the number of caching agents sharing a cache line is fewer than the threshold number, coherency manager 130 maintains directory 140 as an index. Using a precise snoop filter, coherency manager 130 queries directory 140 using the cache line address of the requested cache line. Coherency manager 130 determines, based on querying directory 140, whether at least one of the caching agents currently tracked in directory 140 holds a copy of the requested cache line. For example, coherency manager 130 determines whether the requested cache line is associated with an index, where the index corresponds to one of caching agents 121-129 that stores a copy of the cache line.

If coherency manager 130 determines that the requested cache line is associated with an index, then, coherency manager 130 transmits a snoop to the caching agent that corresponds to the index. The snoop may instruct the caching agent holding the copy of the requested cache line to, for example, transmit the copy of the cache line to the caching agent that generated the request, invalidate the copy of the cache line, change a state of the cache line, or the like. In some instances, coherency manager 130 determines, based on querying directory 140, that none of the caching agents that are currently tracked in directory 140 hold a copy of the requested cache line. As such, coherency manager 130 retrieves a copy of the requested cache line from main memory 150 and transmits the copy to the caching agent that generated the request. Coherency manager 130 creates a new record in directory 140 associated with the requested cache line and assigns an index to the caching agent that generated the request. The new directory record indicates that the index associated with the caching agent that generated the request holds a copy of the requested cache line.

If, based on comparing the number of caching agents sharing a cache line to the the threshold number, coherency manager 130 determines that the number of caching agents sharing a cache line exceeds the threshold number, then coherency manager 130 changes the mode of operation of directory 140 from an index to a bitmap. Coherency manager 130 does so because, for each caching agent in excess of the Nth number of caching agents that can be tracked precisely, directory 140 is unable to record subsequent caching agents. When directory 140 operates as a bitmap, a bitmap is generated for each cache line address to identify groups of caching agents that store a copy of the cache line at a cache line address. Multiple caching agents are grouped together and assigned to a single bit, or more than one bit. A state of each bit indicates whether at least one caching agent within the group assigned to the bit holds a copy of the cache line.

However, because directory 140 cannot record caching agents in excess of the Nth number of caching agents, coherency manager 130 cannot query directory 140 to identify a caching agent that holds a copy of the requested cache line. Therefore, using an imprecise snoop filter, coherency manager 130 parses the bitmap to identify groups of caching agents where at least one caching agent holds a copy of the requested cache line. In particular, coherency manager 130 identifies bits that are in a "1" state as such bits indicate that at least one caching agent within the group assigned to the bit holds a copy of the requested cache line. Based on identifying at least one bit in a "1" state, coherency manager 130 transmits multicast snoops to the groups of caching agents associated with the bits in a "1" state to determine the current state of the cache line. In some instances, the snoop includes instructions to transmit a copy of the requested cache line to the caching agent that generated the request if the caching that received the snoop holds the copy of the requested cache line. In some instances, the snoop includes instructions to invalidate the copy of the cache line, change a state of the cache line, or the like.

In some instances, the request generated by a caching agent is a request to remove a cache line from at least one of directory 140 or main memory 150. Based on receiving the request, coherency manager 130 removes the indicated cache line from at least one of directory 140 or main memory 150, and decreases the number of caching agents sharing a cache line by one.

Coherency manager 130 does so when directory 140 is configured as either one of an index or a bitmap.

FIG. 5 illustrates a flow diagram for an example method for dynamic snoop-filter allocation for large-scale memory coherent systems. The operations described herein are presented in the current order by way of example, and the order is not meant to be limiting. Moreover, operations may be omitted from or added to the example method. Furthermore, while the example method describes processing a single request for a cache line, multiple requests for different cache lines can be processed in parallel.

At block 501, coherency manager 130 operates the memory in a first mode, wherein the first mode maintains a current state of a cache line in a directory using indices and an index corresponds to a caching agent storing a copy of the cache line. Coherency manager 130 receives, from a caching agent, a request to access a cache line. Based on receiving the request, coherency manager 130 increases the number of caching agents sharing a cache line by one.

At block 502, coherency manager 130 compares a count of caching agents sharing the cache line to a threshold number, wherein the threshold number indicates a maximum number of caching agents that can be tracked in the directory. Coherency manager 130 uses the comparison to determine whether to maintain operation of directory 140 in the first mode. Based on determining that the count of caching agents sharing a cache line is less than the threshold number, coherency manager 130 queries directory 140 to identify an index associated with a caching agent that holds a copy of the requested cache line. Coherency manager 130 uses a cache line address associated with the requested cache line to query directory 140. Coherency manager 130 determines, based on the querying, whether at least one index holds a copy of the requested cache line. If an index holds a copy of the requested cache line, then, using a precise snoop filter, coherency manager 130 transmits a snoop to the caching agent that corresponds to the index.

If, based on the querying, coherency manager 130 determines that no index holds a copy of the requested cache line, then coherency manager 130 retrieves a copy of the requested cache line from main memory 150 and transmits the copy to the caching agent that generated the request.

If, based on comparing the count of caching agents sharing the cache line to a threshold number, coherency manager 130 determines that the count exceeds the threshold number, coherency manager 130 proceeds to block 503.

At block 503, coherency manager 130, based on determining the count is greater than the threshold number, dynamically changes an operation of the memory from the first mode to a second mode. For example, coherency manager 130 changes the operation of directory 140 from an index to a bitmap. When operated as a bitmap, directory 140 stores a bitmap for each cache line address. Groups of caching agents are assigned to each bit of the bitmap and the state of each bit indicates whether at least one caching agent within the group holds a copy of the cache line at the cache line address. Coherency manager 130 uses the state of each bit to determine whether a group contains at least one caching agent that stores a copy of the requested cache line. Using an imprecise snoop filter, coherency manager 130 transmits multicast snoops to each caching agent associated with the groups where at least one caching agent of the group holds a copy of the requested cache line.

Figure 6:
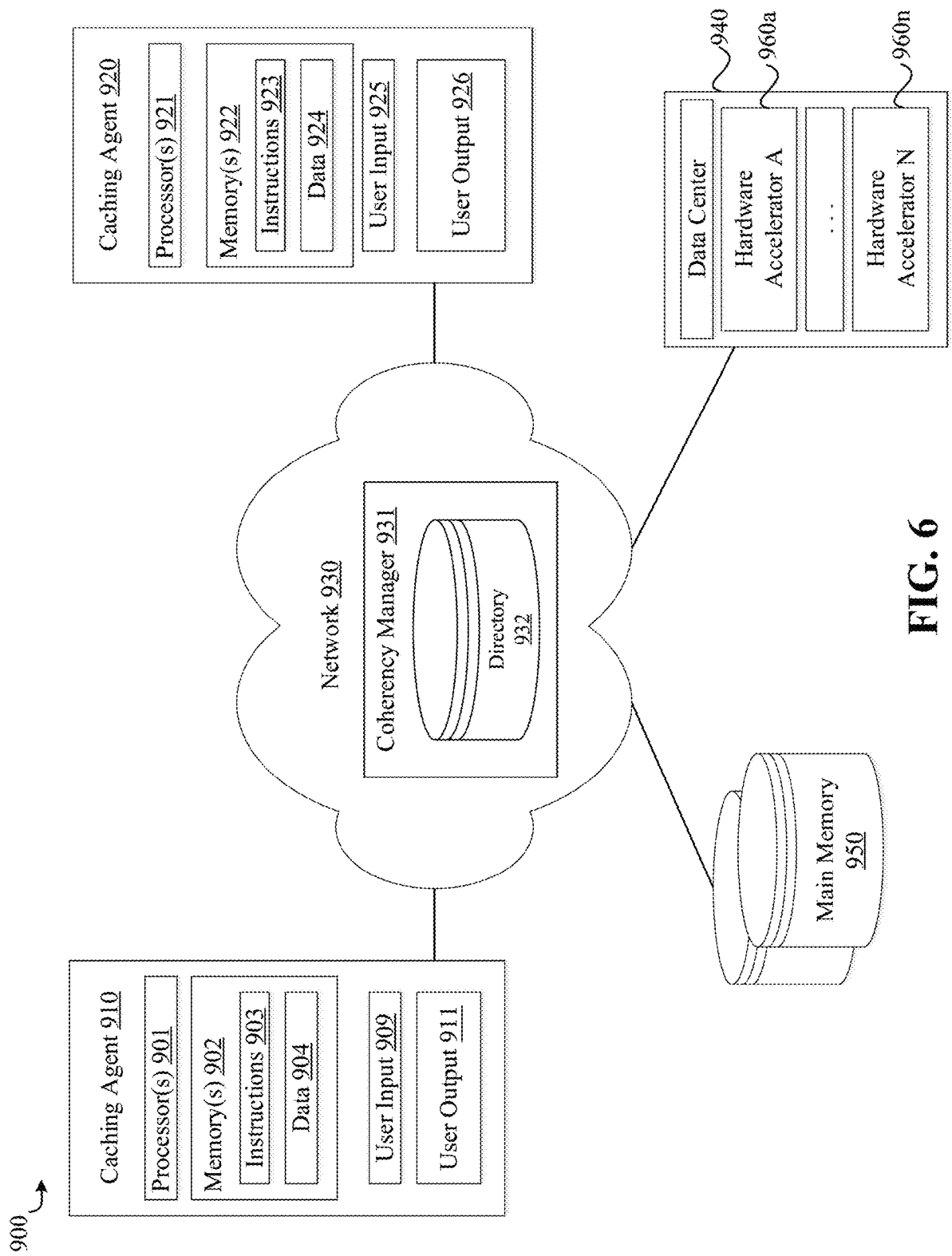
FIG. 6 illustrates a block diagram of an example computing environment for dynamic snoop-filter allocation for large-scale memory coherent systems, in accordance with aspects of the disclosure.

FIG. 6 illustrates a block diagram of an example computing environment for dynamic snoop-filter allocation for large-scale memory coherent systems. Snoop filter allocation is performed by a memory management device, such as a coherency manager, and/or a computing device that supports memory management software and hardware. The memory management device is configured to communicate with a plurality of caching agents, where a caching agent is a computing device that includes at least one or more processors and memory. The memory management device and the plurality of caching agents communicate via an interconnect. In some instances, one or more of the caching agents are in diverse geographic regions, but are able to communicate with the memory management device via the interconnect.

Caching agent 910 and caching agent 920 are each configured to communicate with coherency manager 931 hosted by network 930. Caching agent 910 and caching agent 920 may be communicatively coupled to one or more storage devices over a network. The storage devices may be a combination of volatile and non-volatile memory and may be at the same or different physical locations than the computing devices. For example, the storage devices may include any type of non-transitory computer readable medium capable of storing information, such as a hard-drive, solid state drive, tape drive, optical storage, memory card, ROM, RAM, DVD, CD-ROM, write-capable, and read-only memories.

Caching agent 910 may include one or more processors and memory, such as processor(s) 901 and memory(s) 902 (referred to herein as memory 902). Memory(s) 902 may include instructions 903 and data 904. Caching agent 910 may also include a user input and a user output, such as user input 909 and user output 911.

Memory 902 may store information accessible by the processors, including instructions that may be executed by the processors. Memory 902 may also include cache line data that may be read, retrieved, manipulated, or stored by the processors. Memory 902 may be a type of non-transitory computer readable medium capable of storing information accessible by the processors, such as volatile and non-volatile memory. The processors may include one or more central processing units (CPUs), graphic processing units (GPUs), field-programmable gate arrays (FPGAs), and/or application-specific integrated circuits (ASICs), such as tensor processing units (TPUs).

Instructions 903 may include one or more instructions that, when executed by the processors, cause the one or more processors to perform actions defined by the instructions. Instructions 903 may be stored in object code format for direct processing by the processors, or in other formats including interpretable scripts or collections of independent source code modules that are interpreted on demand or compiled in advance. Instructions 703 may include instructions for storing cache line data, retrieving cache line data, requesting access to cache line data, or the like.

Data 904 may be read, retrieved, stored, or modified by the processors in accordance with the instructions. Data 904 may be stored in computer registers, in a relational or non-relational database as a table having a plurality of different fields and records, or as JSON, YAML, proto, or XML documents. Data 904 may also be formatted in a computer-readable format such as, but not limited to, binary values, ASCII, or Unicode. Moreover, data 904 may include information sufficient to identify relevant information, such as numbers, descriptive text, proprietary codes, pointers, references to data stored in other memories, including other network locations, or information used by a function to calculate relevant data.

User input 909 may include any appropriate mechanism or technique for receiving input, such as keyboard, mouse, mechanical actuators, soft actuators, touchscreens, microphones, and sensors. In some instances, user input 909 may be used to generate requests to access cache lines and to transmit the requests to coherency manager 931.

User output 911 may be used to receive notifications indicating whether a request to access a cache line was processed by coherency manager 931.

Caching agent 920 is configured similarly to caching agent 910, with one or more processors, memory, instructions, and data, such as processor(s) 921, memory(s) 922, instructions 923 and data 924. Caching agent 920 also includes a user input and a user output, such as user input 925 and user output 926. User input 925 may include any appropriate mechanism or technique for at least generating requests to access cache lines and transmitting the requests to coherency manager 931, such as keyboard, mouse, mechanical actuators, soft actuators, touchscreens, microphones, and sensors. User output 926 may be used to receive notifications indicating whether a request to access a cache line was processed by coherency manager 931. User output 926 can alternatively or additionally include one or more speakers, transducers or other audio outputs, a haptic interface or other tactile feedback that provides non-visual and non-audible information to the platform user of caching agent 920.

Although FIG. 6 illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

Caching agent 910 and caching agent 920 may be connected over network 930 to a data center housing any number of hardware accelerators, such as data center 940 housing hardware accelerators 960a-960n. Data center 940 can be one of multiple data centers or other facilities in which various types of computing devices, such as hardware accelerators, are located. Computing resources housed in the data center can be specified for dynamic snoop-filter allocation for large-scale memory coherent systems, as described herein.

Main memory 950 may store all cache line data stored in caching agents 910 and 920. While only two caching agents are illustrated in FIG. 6, environment 900 can include any number of caching agents and main memory 950 can store cache line data stored in each caching agent within environment 900. Coherency manager 931 may access main memory 950 to retrieve copies of requested cache lines based on determining that none of the caching agents that are tracked in directory 932 hold a copy of the requested cache line.

Caching agent 910, caching agent 920, and coherency manager 931 are capable of direct and indirect communication over network 930. Further, coherency manager 931, main memory 950, and data center 940 are capable of direct and indirect communication over network 930. For example, using a network socket, at least one of caching agent 910 or caching agent 920 can connect to a service operating in data center 940 through an Internet protocol. Caching agent 910 and caching agent 920 may set up listening sockets that may accept an initiating connection for sending and receiving information. Network 930 itself may include various configurations and protocols including the Internet, World Wide Web, intranets, virtual private networks, wide area networks, local networks, and private networks using communication protocols proprietary to one or more companies. Network 930 may support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. Network 930 may, in addition or alternatively, also support wired connections between the caching agents and the data center, including over various types of Ethernet connection.

It is understood that the aspects of the disclosure may be implemented according to a variety of different configurations and quantities of computing devices, including in paradigms for sequential or parallel processing, or over a distributed network of multiple devices.

Aspects of the disclosed technology may take the form of a method, process, apparatus, or system for switching between modes of memory. Those examples may include one or more of the following features (e.g., F1 through F20):

F1. A method for switching between modes of memory, the method comprising:
  operating the memory in a first mode, wherein the first mode maintains a current state of a cache line in a directory using indices, an index corresponding to a caching agent storing a copy of the cache line;
  comparing a count of caching agents sharing the cache line to a threshold number, wherein the threshold number indicates a maximum number of caching agents that can be tracked in the directory; and
  based on determining the count is greater than the threshold number, dynamically changing an operation of the memory from the first mode to a second mode.

F2. The method of F1, further comprising:
  receiving, from a first caching agent, a request to access the cache line; and
  increasing the count.

F3. The method of any one of F1 to F2, further comprising, based on determining the count is equal to or less than the threshold number, querying the directory using a cache line address to identify a second index of a second caching agent storing the copy of the cache line.

F4. The method of any one of F1 to F3, further comprising transmitting a snoop to the second caching agent, the snoop comprising instructions to:
  transmit the copy of the cache line to the first caching agent;
  invalidate the copy of the cache line; or
  change a state of the cache line.

F5. The method of any one of F1 to F4, further comprising:
  determining, based on querying the directory, none of the caching agents in the directory store the copy of the cache line;
  retrieving, in response to determining none of the caching agents in the directory store the copy of the cache line, the copy of the cache line from a main memory; and
  transmitting the copy of the cache line to the first caching agent.

F6. The method of any one of F1 to F5, further comprising:
  assigning the index to the first caching agent; and
  generating a record in the directory, the record indicating that the first caching agent stores a copy of the cache line.

F7. The method of any one of F1 to F6, further comprising:
  receiving, from a first caching agent, a request to remove the cache line from a memory associated with the first caching agent; and
  decreasing the count.

F8. The method of any one of F1 to F7, wherein the second mode identifies caching agents storing the copy of the cache line using a bitmap.

F9. The method of any one of F1 to F8, wherein a single bit corresponds to a group of caching agents, wherein one or more caching agents of the group store the copy of the cache line.

F10. The method of any one of F1 to F9, further comprising, based on receiving a request to access the cache line, transmitting multicast snoops to one or more groups to identify the caching agent storing the copy of the cache line.

F11. A system for switching between modes of memory, the system comprising:
  a first caching agent;
  a second caching agent;
  an interconnect configured to connect the first caching agent, the second caching agent, and a caching agent manager; and
  the caching agent manager comprising one or more processors configured to:
    operate the memory in a first mode, wherein the first mode maintains a current state of a cache line in a directory using indices, an index corresponding to a caching agent storing a copy of the cache line;
    compare a count of caching agents sharing the cache line to a threshold number, wherein the threshold number indicates a maximum number of caching agents that can be tracked in the directory; and
    based on determining the count is greater than the threshold number, dynamically change an operation of the memory from the first mode to a second mode.

F12. The system of F11, wherein the one or more processors are further configured to: receive, from the first caching agent, a request to access the cache line;
  increase the count; and
  based on determining the count is equal to or less than the threshold number, query the directory using a cache line address to identify a second index of the second caching agent storing the copy of the cache line.

F13. The system of any one of F11 to F12, wherein the one or more processors are further configured to:
- determine, based on querying the directory, none of the caching agents in the directory store the copy of the cache line;
- retrieve the copy of the cache line from a main memory based on determining none of the caching agents in the directory store the copy of the cache line; and
- transmit the copy of the cache line to the first caching agent.

F14. The system of any one of F11 to F13, wherein:
- the second mode identifies caching agents storing the copy of the cache line using a bitmap; and
- a single bit on the bitmap corresponds to a group of caching agents, wherein one or more caching agents of the group store the copy of the cache line.

F15. The system of any one of F11 to F14, wherein the one or more processors are further configured to, based on receiving a request to access the cache line, transmit multicast snoops to one or more groups to identify a caching agent storing the copy of the cache line.

F16. A non-transitory computer readable storage medium storing instructions that, when executed by one or more processors for switching between modes of memory, cause the one or more processors to:
- operate the memory in a first mode, wherein the first mode maintains a current state of a cache line in a directory using indices, an index corresponding to a caching agent storing a copy of the cache line;
- compare a count of caching agents sharing the cache line to a threshold number, wherein the threshold number indicates a maximum number of caching agents that can be tracked in the directory; and
- based on determining the count is greater than the threshold number, dynamically change an operation of the memory from the first mode to a second mode.

F17. The non-transitory computer readable storage medium of F16, wherein the one or more processors are further configured to:
- receive, from a first caching agent, a request to access the cache line;
- increase the count; and
- based on determining the count is equal to or less than the threshold number, query the directory using a cache line address to identify a second index of a second caching agent storing the copy of the cache line.

F18. The transitory computer readable storage medium of any one of F16 to F17, wherein the one or more processors are further configured to:
- determine, based on querying the directory, none of the caching agents in the directory store the copy of the cache line;
- retrieve the copy of the cache line from a main memory; and
- transmit the copy of the cache line to the first caching agent.

F19. The non-transitory computer readable storage medium of any one of F16 to F18, wherein:
- the second mode identifies caching agents storing the copy of the cache line using a bitmap; and
- a single bit on the bitmap corresponds to a group of caching agents, wherein one or more caching agents of the group store the copy of the cache line.

F20. The non-transitory computer readable storage medium of any one of F16 to F19, wherein the one or more processors are further configured to:
- based on receiving from a first caching agent a request to access the cache line, transmit multicast snoops to the one or more caching agents of the group to identify a second caching agent storing the copy of the cache line;
- identify the second caching agent storing the copy of the cache line based on transmitting the multicast snoops; and
- instruct the second caching agent to transmit the copy of the cache line to the first caching agent.

The foregoing aspects of this technology offer dynamic snoop-filter allocations for large scale memory coherent systems thus reducing the required memory of the snoop-filter with minimal impact on performance. The coherency manager dynamically switches between different methods of using memory. The coherency manager efficiently filters the number of snoops transmitted to caching agents based on maintaining a current state of each shared cache line in the directory. Filtering the number of snoops that are needed reduces the traffic on the interconnect and avoids increasing the power consumption of the system.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers or special purpose logic circuitry, such as a system on chip (SoC) executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for switching between modes of memory, the method comprising:
operating the memory in a first mode, wherein the first mode maintains a current state of a cache line in a directory using indices, an index of the directory corresponding to a caching agent storing a copy of the cache line;
comparing a count of caching agents sharing the cache line to a threshold directory capacity, wherein the threshold directory capacity indicates a maximum number of caching agents that can be tracked in the directory;
determining that the count is greater than the threshold directory capacity;
based on determining that the count is greater than the threshold directory capacity, dynamically changing operation of the memory from the first mode to a second mode by generating a bitmap, wherein a bit of the bitmap indicates at least one caching agent within a group of caching agents stores a copy of the cache line; and
operating the memory in the second mode using the bitmap.

2. The method of claim 1, further comprising:
receiving, from a first caching agent, a request to access the cache line; and
increasing the count.

3. The method of claim 2, further comprising:
determining that the count is less than or equal to the threshold directory capacity; and;
based on determining that the count is less than or equal to the threshold directory capacity, querying the directory using a cache line address to identify a second index of a second caching agent storing the copy of the cache line.

4. The method of claim 3, further comprising transmitting a snoop to the second caching agent, the snoop comprising instructions to:
transmit the copy of the cache line to the first caching agent;
invalidate the copy of the cache line; or
change a state of the cache line.

5. The method of claim 3, further comprising:
determining, based on querying the directory, none of the caching agents in the directory store the copy of the cache line;
retrieving, in response to determining none of the caching agents in the directory store the copy of the cache line, the copy of the cache line from a main memory; and
transmitting the copy of the cache line to the first caching agent.

6. The method of claim 5, further comprising:
assigning the index to the first caching agent; and
generating a record in the directory, the record indicating that the first caching agent stores a copy of the cache line.

7. The method of claim 1, further comprising:
receiving, from a first caching agent, a request to remove the cache line from a memory associated with the first caching agent; and
decreasing the count.

8. The method of claim 1, further comprising, based on receiving a request to access the cache line, transmitting multicast snoops to one or more groups to identify the caching agent storing the copy of the cache line.

9. A system for switching between modes of memory, the system comprising:
a first caching agent;
a second caching agent;
an interconnect configured to connect the first caching agent, the second caching agent, and a caching agent manager; and
the caching agent manager comprising one or more processors configured to:
operate the memory in a first mode, wherein the first mode maintains a current state of a cache line in a directory using indices, an index of the directory corresponding to a caching agent storing a copy of the cache line;
compare a count of caching agents sharing the cache line to a threshold directory capacity, wherein the threshold directory capacity indicates a maximum number of caching agents that can be tracked in the directory;
determine that the count is greater than the threshold directory capacity;
based on determining that the count is greater than the threshold directory capacity, dynamically change operation of the memory from the first mode to a second mode by generating a bitmap, wherein a bit of the bitmap indicates at least one caching agent within a group of caching agents stores a copy of the cache line; and
operate the memory in the second mode using the bitmap.

10. The system of claim 9, wherein the one or more processors are further configured to:
receive, from the first caching agent, a request to access the cache line;
increase the count;
determine that the count is less than or equal to the threshold directory capacity; and
based on determining that the count is less than or equal to the threshold directory capacity, query the directory using a cache line address to identify a second index of the second caching agent storing the copy of the cache line.

11. The system of claim 10, wherein the one or more processors are further configured to:
determine, based on querying the directory, none of the caching agents in the directory store the copy of the cache line;
retrieve the copy of the cache line from a main memory based on determining none of the caching agents in the directory store the copy of the cache line; and
transmit the copy of the cache line to the first caching agent.

12. The system of claim 9, wherein the one or more processors are further configured to, based on receiving a request to access the cache line, transmit multicast snoops to one or more groups to identify a caching agent storing the copy of the cache line.

13. A non-transitory computer readable storage medium storing instructions that, when executed by one or more processors for switching between modes of memory, cause the one or more processors to:
operate the memory in a first mode, wherein the first mode maintains a current state of a cache line in a directory using indices, an index of the directory corresponding to a caching agent storing a copy of the cache line;
compare a count of caching agents sharing the cache line to a threshold directory capacity, wherein the threshold directory capacity indicates a maximum number of caching agents that can be tracked in the directory;
determine that the count is greater than the threshold directory capacity;
based on determining the count is greater than the threshold directory capacity, dynamically change operation of the memory from the first mode to a second mode by generating a bitmap, wherein a bit of the bitmap indicates at least one caching agent within a group of caching agents stores a copy of the cache line; and
operate the memory in the second mode using the bitmap.

14. The non-transitory computer readable storage medium of claim 13, wherein the one or more processors are further configured to:
receive, from a first caching agent, a request to access the cache line;
increase the count;
determine that the count is less than or equal to the threshold directory capacity; and
based on determining the count is less than or equal to the threshold directory capacity, query the directory using a cache line address to identify a second index of a second caching agent storing the copy of the cache line.

15. The transitory computer readable storage medium of claim 14, wherein the one or more processors are further configured to:
- determine, based on querying the directory, none of the caching agents in the directory store the copy of the cache line;
- retrieve the copy of the cache line from a main memory; and
- transmit the copy of the cache line to the first caching agent.

16. The non-transitory computer readable storage medium of claim 13, wherein the one or more processors are further configured to, based on receiving a request to access the cache line, transmit multicast snoops to one or more groups to identify a caching agent storing the copy of the cache line.

* * * * *